(12) United States Patent
Sandhu et al.

(10) Patent No.: US 9,042,697 B2
(45) Date of Patent: May 26, 2015

(54) RESONATOR FOR THERMO OPTIC DEVICE

(75) Inventors: Gurtej Singh Sandhu, Boise, ID (US);
Guy T. Blalock, Boise, ID (US);
Howard E. Rhodes, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 13/483,542

(22) Filed: May 30, 2012

(65) Prior Publication Data
US 2012/0237165 A1 Sep. 20, 2012

Related U.S. Application Data (60) Continuation of application No. 11/951,796, filed on Dec. 6, 2007, now Pat. No. 8,195,020, which is a division of application No. 11/493,717, filed on Jul. 26, 2006, now Pat. No. 7,323,353, which is a continuation of application No. 10/231,897, filed on Aug. 29, 2002, now Pat. No. 7,120,336.

(51) Int. Cl.
| | |
|---|---|
| G02B 6/10 | (2006.01) |
| G02B 6/26 | (2006.01) |
| G02B 6/42 | (2006.01) |
| G02B 6/132 | (2006.01) |
| G02B 6/12 | (2006.01) |

(Continued)

(52) U.S. Cl.
CPC ............ *G02B 6/132* (2013.01); *G02B 6/12004* (2013.01); *G02B 6/12007* (2013.01); *G02B 6/136* (2013.01); *G02F 1/011* (2013.01); *G02F 1/0147* (2013.01); *G02F 2203/15* (2013.01)

(58) Field of Classification Search
CPC ........ G02B 6/122; G02B 6/125; G02B 6/132; G02B 6/262; G02B 6/1225; G02B 6/12007; G02B 6/29395

USPC .................................................. 385/39, 129
See application file for complete search history.

(56) References Cited

U.S. PATENT DOCUMENTS

| | | |
|---|---|---|
| 3,589,794 A | 6/1971 | Marcatili et al. |
| 4,166,669 A | 9/1979 | Leonberger et al. |
| 4,518,219 A | 5/1985 | Leonberger et al. |

(Continued)

OTHER PUBLICATIONS

Damask, Jay N., "Integrated-Optic Grating-Based Filters for Optical Communication Systems", Doctoral Thesis, Department of Electrical Engineering, Massachusetts Institute of Technology, (May 6, 1996), 143-183.

*Primary Examiner* — Jerry Blevins
(74) *Attorney, Agent, or Firm* — Schwegman Lundberg & Woessner, P.A.

(57) ABSTRACT

A resonator for thermo optic devices is formed in the same process steps as a waveguide and is formed in a depression of a lower cladding while the waveguide is formed on a surface of the lower cladding. Since upper surfaces of the resonator and waveguide are substantially coplanar, the aspect ratio, as between the waveguide and resonator in an area where the waveguide and resonator front one another, decreases thereby increasing the bandwidth of the resonator. The depression is formed by photomasking and etching the lower cladding before forming the resonator and waveguide. Pluralities of resonators are also taught that are formed in a plurality of depressions of the lower cladding. To decrease resonator bandwidth, waveguide(s) are formed in the depression(s) of the lower cladding while the resonator is formed on the surface. Thermo optic devices formed with these resonators are also taught.

19 Claims, 10 Drawing Sheets

(51) Int. Cl.
*G02B 6/136* (2006.01)
*G02F 1/01* (2006.01)

(56) References Cited

U.S. PATENT DOCUMENTS

| | | |
|---|---|---|
| 4,592,043 A | 5/1986 | Williams |
| 4,616,898 A | 10/1986 | Hicks, Jr. |
| 4,665,421 A | 5/1987 | Borner et al. |
| 4,799,749 A | 1/1989 | Borner et al. |
| 4,859,017 A | 8/1989 | Brierley et al. |
| 4,886,538 A | 12/1989 | Mahapatra |
| 5,155,620 A | 10/1992 | Gordon et al. |
| 5,408,568 A | 4/1995 | Hamilton |
| 5,579,424 A | 11/1996 | Schneider |
| 5,639,386 A | 6/1997 | Burke et al. |
| 5,710,849 A | 1/1998 | Little et al. |
| 5,784,400 A | 7/1998 | Joannopoulos et al. |
| 5,838,845 A | 11/1998 | Leone et al. |
| 5,841,931 A | 11/1998 | Foresi et al. |
| 5,915,051 A | 6/1999 | Damask et al. |
| 5,987,196 A | 11/1999 | Noble |
| 6,022,671 A | 2/2000 | Binkley et al. |
| 6,035,089 A | 3/2000 | Grann et al. |
| 6,052,495 A | 4/2000 | Little |
| 6,090,636 A | 7/2000 | Geusic et al. |
| 6,097,865 A | 8/2000 | Alferness et al. |
| 6,101,300 A | 8/2000 | Fan et al. |
| 6,108,464 A | 8/2000 | Foresi et al. |
| 6,144,779 A | 11/2000 | Binkley et al. |
| 6,144,784 A * | 11/2000 | Shigehara et al. ............. 385/24 |
| 6,150,188 A | 11/2000 | Geusic et al. |
| 6,219,366 B1 | 4/2001 | Furushima |
| 6,278,168 B1 | 8/2001 | Day |
| 6,311,004 B1 | 10/2001 | Kenney et al. |
| 6,360,047 B1 | 3/2002 | Nekado et al. |
| 6,393,185 B1 * | 5/2002 | Deacon ........................ 385/50 |
| 6,396,988 B1 | 5/2002 | Shimoda |
| 6,400,856 B1 | 6/2002 | Chin |
| 6,411,752 B1 | 6/2002 | Little et al. |
| 6,433,919 B1 | 8/2002 | Chowdhury et al. |
| 6,434,282 B1 | 8/2002 | Binkley et al. |
| 6,449,417 B1 | 9/2002 | Binkley et al. |
| 6,453,377 B1 | 9/2002 | Farnworth et al. |
| 6,465,269 B2 | 10/2002 | Furushima |
| 6,519,658 B2 | 2/2003 | Farnworth et al. |
| 6,522,812 B1 | 2/2003 | Nikonov |
| 6,526,191 B1 | 2/2003 | Geusic et al. |
| 6,532,326 B1 | 3/2003 | Hutchinson et al. |
| 6,567,573 B1 | 5/2003 | Domash et al. |
| 6,571,039 B1 | 5/2003 | Al-hemyari et al. |
| 6,573,813 B1 | 6/2003 | Joannopoulos et al. |
| 6,748,138 B2 | 6/2004 | Wang et al. |
| 6,865,314 B1 | 3/2005 | Blair et al. |
| 6,913,705 B2 | 7/2005 | Nakata |
| 6,950,581 B2 | 9/2005 | Bandyopadhyay |
| 6,975,798 B2 | 12/2005 | Blauvelt et al. |
| 6,995,441 B2 | 2/2006 | Geusic et al. |
| 7,003,205 B2 | 2/2006 | Cho et al. |
| 7,006,746 B2 | 2/2006 | Blalock et al. |
| 7,020,365 B2 | 3/2006 | Sandhu et al. |
| 7,116,876 B2 | 10/2006 | Jang et al. |
| 7,120,336 B2 | 10/2006 | Sandhu et al. |
| 7,120,341 B2 | 10/2006 | Oh et al. |
| 7,215,838 B2 | 5/2007 | Sandhu et al. |
| 7,323,353 B2 | 1/2008 | Sandhu et al. |
| 7,359,607 B2 | 4/2008 | Blalock et al. |
| 7,509,005 B2 | 3/2009 | Sandhu et al. |
| 7,565,039 B2 | 7/2009 | Sandhu et al. |
| 7,706,647 B2 | 4/2010 | Sandhu et al. |
| 7,720,341 B2 | 5/2010 | Blalock et al. |
| 7,936,955 B2 | 5/2011 | Blalock et al. |
| 8,111,965 B2 | 2/2012 | Blalock et al. |
| 8,195,020 B2 | 6/2012 | Sandhu et al. |
| 2001/0022877 A1 * | 9/2001 | Sadot et al. ..................... 385/27 |
| 2001/0026670 A1 | 10/2001 | Takizawa et al. |
| 2001/0046363 A1 | 11/2001 | Purchase et al. |
| 2002/0018634 A1 | 2/2002 | Korenaga et al. |
| 2002/0158718 A1 | 10/2002 | Kundu |
| 2002/0186920 A1 | 12/2002 | Viens et al. |
| 2002/0191520 A1 | 12/2002 | Nagata et al. |
| 2003/0026575 A1 | 2/2003 | Lempkowski |
| 2003/0033975 A1 | 2/2003 | Bazylenko |
| 2003/0048746 A1 | 3/2003 | Guess et al. |
| 2003/0048994 A1 | 3/2003 | Lemoff et al. |
| 2003/0061836 A1 | 4/2003 | Higuchi et al. |
| 2003/0123827 A1 * | 7/2003 | Salerno et al. ................ 385/129 |
| 2003/0169964 A1 | 9/2003 | Wang et al. |
| 2003/0174945 A1 | 9/2003 | Fried et al. |
| 2003/0174946 A1 | 9/2003 | Viens |
| 2003/0174956 A1 | 9/2003 | Viens |
| 2003/0197186 A1 | 10/2003 | Geusic |
| 2003/0202548 A1 | 10/2003 | Andersen et al. |
| 2004/0001665 A1 | 1/2004 | Zoorob et al. |
| 2004/0008959 A1 | 1/2004 | Haase et al. |
| 2004/0008968 A1 * | 1/2004 | Lee et al. ...................... 385/142 |
| 2004/0037341 A1 * | 2/2004 | Tan et al. ........................ 372/94 |
| 2004/0091198 A1 | 5/2004 | Graves |
| 2004/0114899 A1 | 6/2004 | Mattsson |
| 2004/0213516 A1 | 10/2004 | Gordon |
| 2005/0025424 A1 | 2/2005 | Sandhu et al. |
| 2005/0031263 A1 | 2/2005 | Sandhu et al. |
| 2005/0031284 A1 | 2/2005 | Blalock et al. |
| 2006/0098911 A1 | 5/2006 | Sandhu et al. |
| 2006/0228084 A1 | 10/2006 | Sandhu et al. |
| 2006/0263027 A1 | 11/2006 | Sandhu et al. |
| 2008/0089647 A1 | 4/2008 | Sandhu et al. |
| 2008/0226247 A1 | 9/2008 | Blalock et al. |
| 2010/0220958 A1 | 9/2010 | Blalock et al. |
| 2011/0206332 A1 | 8/2011 | Blalock et al. |

* cited by examiner

RESONATOR FOR THERMO OPTIC DEVICE

RELATED APPLICATIONS

This application is a Continuation of U.S. application Ser. No. 11/951,796, filed Dec. 6, 2007 now U.S. Pat. No. 8,195,020, which is a Divisional of U.S. application Ser. No. 11/493,717, filed Jul. 26, 2006, now issued as U.S. Pat. No. 7,323,353, which is a Continuation of U.S. application Ser. No. 10/231,897, filed Aug. 29, 2002, now issued as U.S. Pat. No. 7,120,336, all of which are incorporated herein by reference in their entirety.

TECHNICAL FIELD

The present invention relates to thermo optic devices, such as optical waveguides. In particular, it relates to a resonator for frequency coupling between input and output waveguides of a thermo optic device. Even more particularly, it relates to an efficiently formed resonator having increased bandwidth.

BACKGROUND

The art of making and developing new uses for thermo optic devices continues to emerge. Presently, thermo optic devices are used as filters, switches, multiplexers, waveguides, and a host of other semiconductor and optical transmission devices.

Figure 1A:
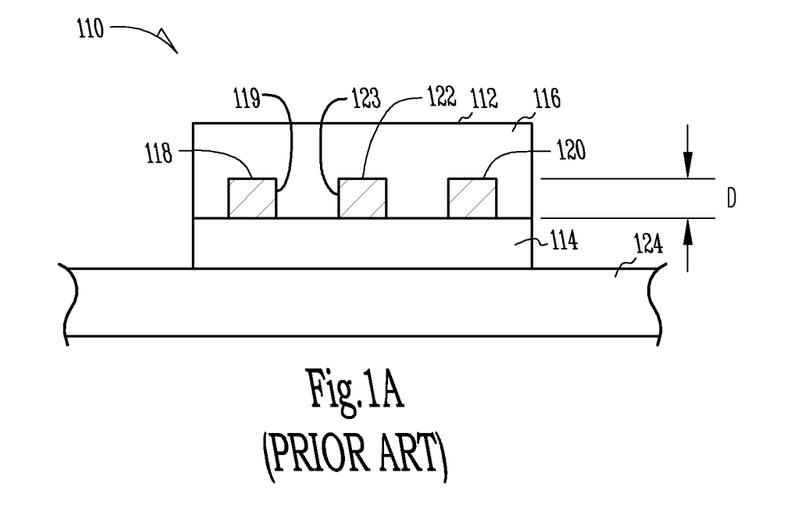
FIG. 1A is a cross sectional view of a thermo optic device in the form of an optical waveguide in accordance with the prior art.
Figure 1B:
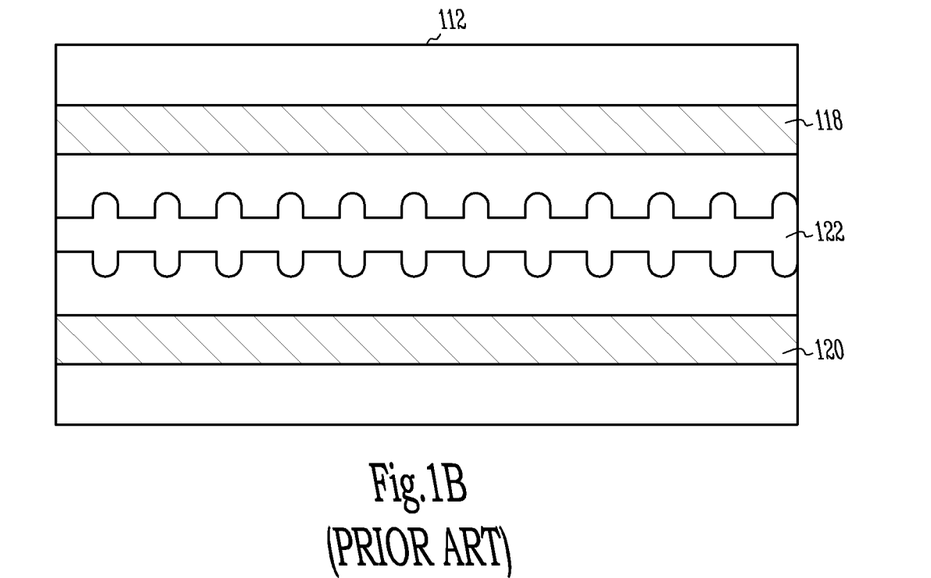
FIG. 1B is a planar view of the thermo optic device of FIG. 1A.

With reference to FIGS. 1A and 1B, a prior art thermo optic device in the form of an optical waveguide is shown generally as 110. It comprises a grating 112 formed of a lower cladding 114, an upper cladding 116, an input waveguide 118, an output waveguide 120 and a resonator 122. As is known, the waveguides and resonator are formed of a material having a higher or lower refractive index than that of the upper and lower claddings to propagate light in the resonator and waveguides during use. The grating 112 is disposed on a substrate 124. In many thermo optic devices the substrate is a printed circuit board or some form of silicon.

In forming the device, the lower cladding is deposited on the substrate. An intermediate layer, for the waveguides and resonator, is deposited on the lower cladding, photo patterned and etched. The upper cladding is deposited on the waveguides and resonator. In an alternate formation process, the lower cladding 202 is an oxidation of a silicon substrate with the waveguides, resonator and upper cladding being formed in the same manner.

The inherent characteristics of a resonator, such as its size, shape, composition, etc., may vary greatly from resonator to resonator as a function of the particular application in which the thermo optic device is to be used. The characteristics of all resonators, however, are generally selected in such a manner to eliminate crosstalk between the input and output waveguides at undesirable frequencies and to resonate signals (i.e., prolong and/or intensify) at desirable frequencies. These desirable frequencies are typically defined in a bandwidth of some length about a center frequency.

In the representative prior art embodiment shown in FIG. 1B, the resonator 122 has a generally symmetrical tooth-shaped pattern. To set the center frequency, the pitch between teeth is adjusted.

To set the bandwidth, an aspect ratio is adjusted in an area where the waveguide and resonator front or face one another. For example, in FIG. 1A, resonator 122 has a surface 123 facing a surface 119 of input waveguide 118. The aspect ratio (a.r.) in this area is defined as the area of the input waveguide surface to the area of the resonator surface (a.r.=area of input waveguide surface/area of resonator surface). A large bandwidth corresponds to a small aspect ratio while a small bandwidth corresponds to a large aspect ratio. Correspondingly, a large bandwidth can be achieved by either increasing the area of the resonator surface, decreasing the area of the input waveguide surface, or adjusting both surface areas in such a manner to achieve a relatively small ratio number. A small bandwidth can be achieved by either decreasing the area of the resonator surface, increasing the area of the input waveguide surface, or adjusting both surface areas in such a manner to achieve a relatively large ratio number. Even further, increases or decreases of surface area can be achieved by adjusting one or both of the surface dimensions of the waveguide or resonator surfaces. For example, depth "D" of surface 119 or 123 may be increased or decreased according to desired bandwidth.

Since the resonator 122 and the input and output waveguides 118, 120 are formed together during the same process steps as described above, the depth, D, of the resonator is essentially fixed as the same depth of the waveguides and therefore the resonator bandwidth is fixed. Moreover, changes in depth that result in increased resonator bandwidth are not trivially accomplished and often result in complicated manufacturing processes and excessive resource and financial expenditures.

Accordingly, the thermo optic arts desire resonators having increased bandwidths that are relatively cheap and quick to produce without sacrifices in any resonator quality, reliability or longevity.

DETAILED DESCRIPTION

In the following detailed description of the preferred embodiments, reference is made to the accompanying drawings which form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process, electrical or mechanical changes may be made without departing from the scope of the present invention. The term substrate used in this specification includes any base semiconductor structure such as silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. The following detailed description is, therefore, not to be taken in a limiting sense, and the scope of the present invention is defined only by the appended claims and their equivalents.

The following description and figures use a reference numeral convention where the first digit of the reference numeral corresponds to the figure and the following two digits correspond to like elements throughout the specification. For example, the lower cladding of a thermo optic device of the present invention has a reference number of 202, 302, 402, etc. corresponding to the lower cladding X02 in FIGS. 2, 3, 4, etc. where X is the number of the figure in which the reference numeral appears.

Figure 2A:
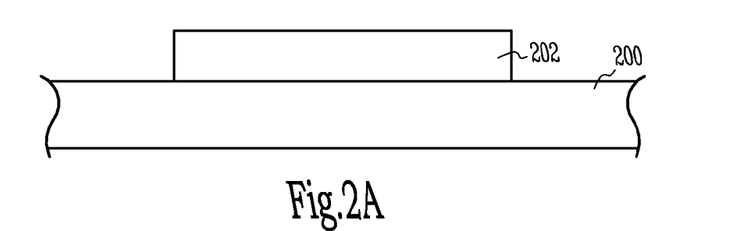
FIG. 2A is a cross sectional view of a lower cladding in which a resonator in accordance with the teachings of the present invention will be formed.
Figure 3A:
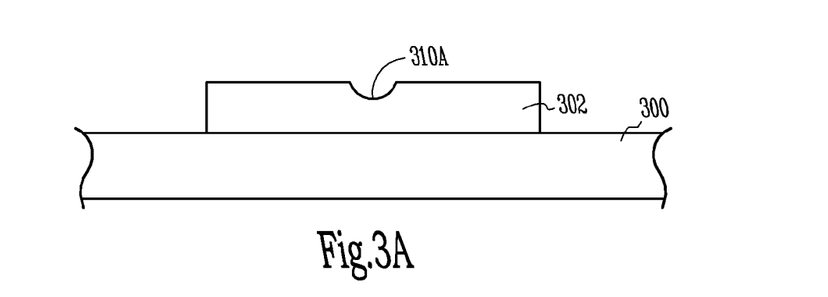
FIG. 3A is a cross sectional view in accordance with the teachings of the present invention of another embodiment of a depression in a lower cladding.
Figure 3B:
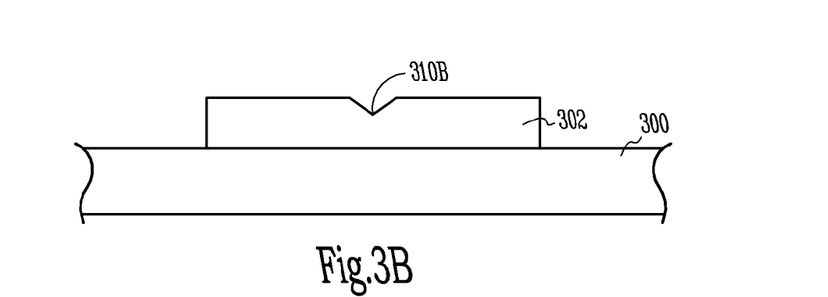
FIG. 3B is a cross sectional view in accordance with the teachings of the present invention of still another embodiment of a depression in a lower cladding.

With reference to FIG. 2A, a substrate 200 is provided upon which a resonator for use with a thermo optic device will be formed. In one embodiment the substrate is silicon. In another embodiment, it is a printed circuit board. In still another, it is any surface upon which a layer may be deposited.

A first layer 202 or lower cladding is formed on the substrate. In one embodiment, the substrate is some form of silicon and the first layer is formed as a grown layer via oxidation of the substrate. In another embodiment, the first layer is formed by deposition techniques.

Some particular deposition techniques for the first layer, and all remaining deposited layers, include, but are not limited to, any variety of chemical vapor depositions (CVD), physical vapor depositions (PVD), epitaxy, evaporation, sputtering or other known or hereinafter developed techniques. Specific CVD techniques include low pressure (LP) ones, but could also be atmospheric pressure (AP), plasma enhanced (PE), high density plasma (HDP) or other.

In one particular embodiment, the first layer is a silicon oxide that is deposited via a LPCVD technique using a tetraethyl orthosilicate or TEOS source.

Figure 2B:
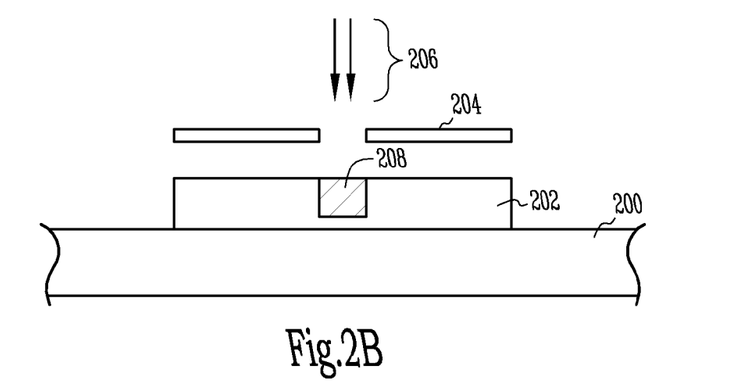
FIG. 2B is a cross sectional view in accordance with the teachings of the present invention of a first photomasking step in a processing step subsequent to FIG. 2A.

After depositing the first layer, a first mask 204 is provided to photo impact 206 the first layer 202 in a photomasking step so that a photo impacted region 208 is formed in the lower cladding.

In one embodiment, the photo impacting is accomplished with an ultraviolet light from a photolithography device well known to those skilled in the art. The photo impacting, however, should not be limited to such an embodiment and may alternatively include X-rays or other light sources.

The first mask 204 may be configured as a clear-field or dark-field mask, as those terms as well understood by skilled artisans, according to the desired design of the photo impacted region 208 in the lower cladding.

Figure 2C:
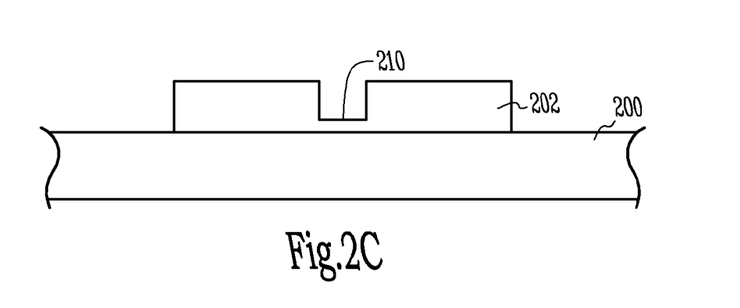
FIG. 2C is a cross sectional view in accordance with the teachings of the present invention of a depression formed in a lower cladding in a processing step subsequent to FIG. 2B.

Thereafter, with reference to FIG. 2C, the first layer 202 is etched so that the photo impacted region 208 is removed thereby leaving or forming a depression 210 in the lower cladding. In the embodiment shown, the depression 210 is shaped as a trench but it may also comprise other shapes, such as a concavity 310A (FIG. 3A), an angular indentation 310B (FIG. 3b) or other.

Figure 6:
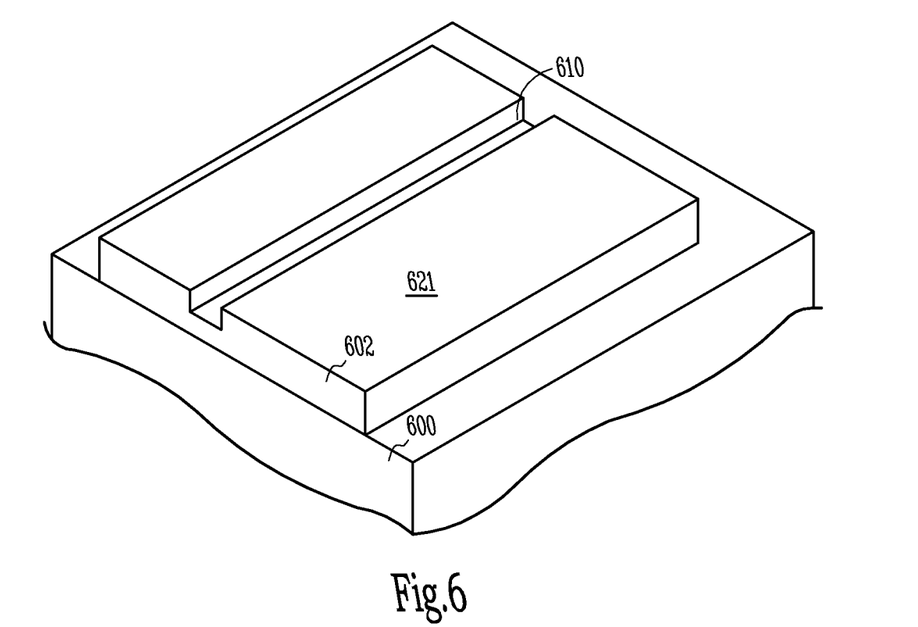
FIG. 6 is a perspective view in accordance with the teachings of the present invention of a depression formed across a lower cladding.
Figure 7:
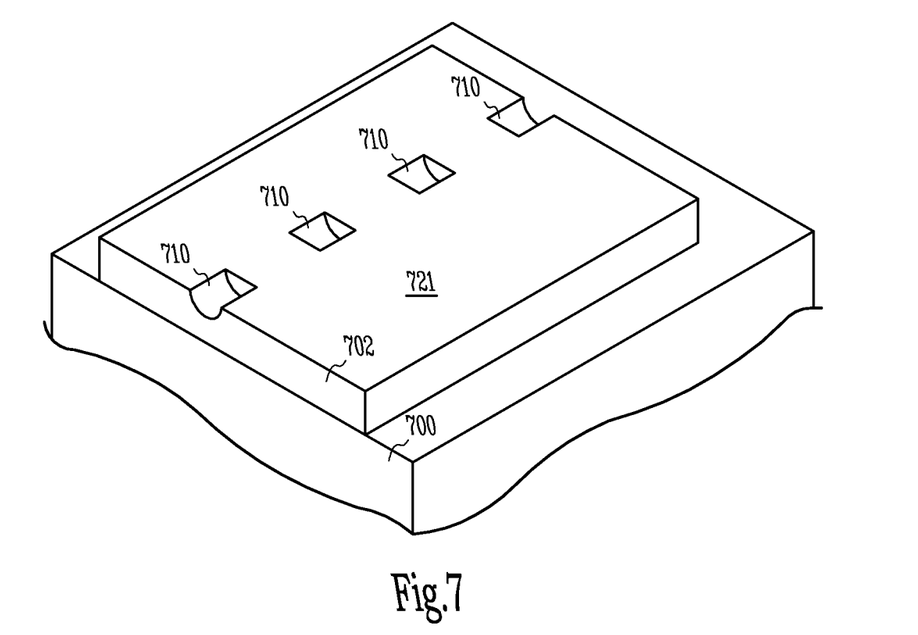
FIG. 7 is a perspective view of an alternative embodiment of a plurality of depressions formed in a lower cladding.

It should be appreciated that while the depression 210 is depicted in a cross sectional view it also has a lengthwise dimension (into or away from the paper) and it may be formed completely across the surface of the lower cladding or may be formed in just a particular region thereof. For example, with reference to FIG. 6, the depression is formed as a trench 610 across an entire surface 621 of lower cladding 602. In FIG. 7, the depression is formed as a plurality of concavities 710 in only various regions of surface 721 of lower cladding 702.

Figure 8:
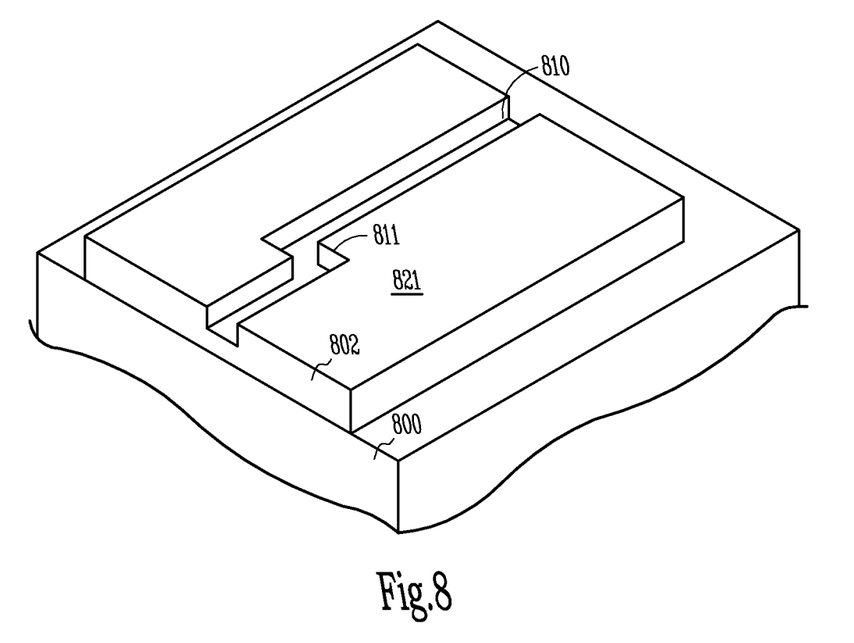
FIG. 8 is a perspective view in accordance with the teachings of the present invention of a depression pattern formed in a lower cladding.
Figure 9:
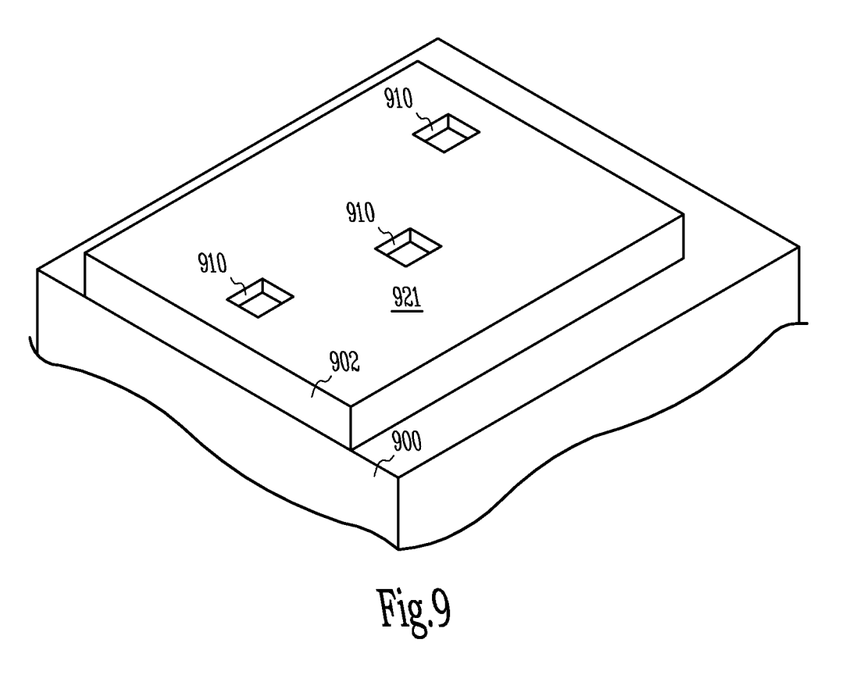
FIG. 9 is a perspective view in accordance with the teachings of the present invention of a plurality of regions of the lower cladding having depressions formed therein.

In still another embodiment, the depression may take on a desired pattern or shape across the lower cladding or in just a particular region. For example, in FIG. 8, the depression is formed as a trench 810 extending lengthwise across surface 821 of the lower cladding 802. The trench 810 has a bend 811 representative of at least one depression pattern. In FIG. 9, the depression of the lower cladding 902 is represented as a plurality of concavities 910 having a generally cube shape that is formed in various specific or random regions of surface 921.

Those skilled in the art will appreciate that even further forms, shapes and dimensions of depressions are formable in the lower cladding and include, but are not limited to rectangles, circles, serpentine formations, tooth-shaped patterns, polygons, triangles, squares, or any other geometric shape(s) that could be fabricated with the first mask. It should be further appreciated that the particularly shown trenches, concavities, and angular indentations may be of various dimensions and take on any or all embodiments shown herein.

With reference to FIGS. 2B and 2C, some etching techniques embraced by this invention for removing the photo impacted region 208 from the lower cladding 202 to form depression 210 include, but are not limited to, any variety of wet etches including immersion or spray, or dry etches including plasma, barrel or planar, ion milling, reactive ion etches (RIE) or deep RIE.

In one particular embodiment of the invention, the photo impacted region 208 is dry etched with a photo resist pattern and $CF_4$ or $CF_4CHF_3$ Argon based chemistry in a parallel plate reactor for 360 seconds under the conditions of about 50 millitorr, 600 watts and 13.56 MHz.

Figure 2D:
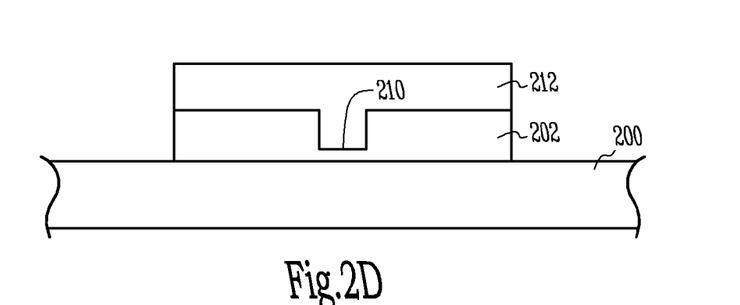
FIG. 2D is a cross sectional view in accordance with the teachings of the present invention of a layer deposited on the lower cladding in a processing step subsequent to FIG. 2C.

With reference to FIG. 2D, a second layer 212 is formed on the surface of the first layer 202 in such a manner to "fill" the depression 210 and cover the lower cladding as shown.

In one embodiment, the second layer is a silicon oxynitride deposited with a PECVD technique using a silane with nitrous oxide reaction in an argon or helium plasma for 180 seconds, under the conditions of 400° C., 450 watts and 13.56 MHz. In another embodiment, the second layer is a translucent material.

While the lower cladding, in one embodiment, was formed of a silicon oxide and the second layer was formed of silicon oxynitride, it should be appreciated that numerous other materials for these first and second layers exist. What dictates the selection of the materials is the index of refraction. This is because the second layer will be formed into the waveguide and resonator and light will be propagated therein via reflections of light that occur at the boundary where the two layers meet. So long as the second layer is a material having an index of refraction that is different, either higher or lower, than the index of refraction for the first layer (at whatever wavelength of light the thermo optic device is designed for) light signals can be propagated.

Figure 2E:
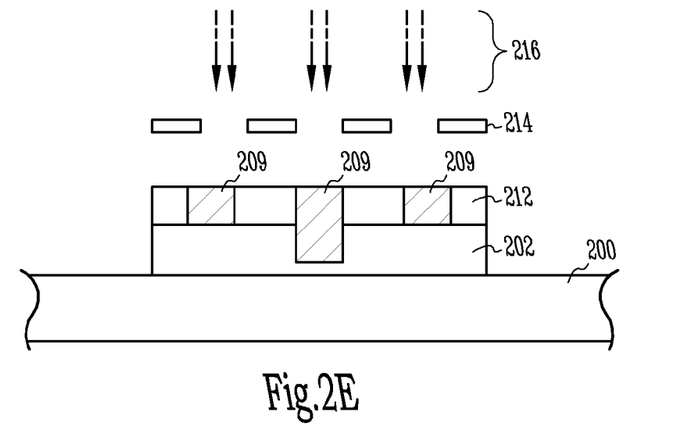
FIG. 2E is a cross sectional view in accordance with the teachings of the present invention of a second photomasking step in a processing step subsequent to FIG. 2D.

With reference to FIG. 2E, after depositing the second layer 212, a second mask 214 is provided to photo impact 216 the second layer 212 in another photomasking step.

As with the first photomasking step, the photo impacting is accomplished with an ultraviolet light from a photolithography device but may alternatively include X-rays or other light sources. The second mask be configured in such a way that the photo impacted region of the second layer takes on a desired form such as those previously shown. Some particular mask embodiments include, but are not limited to, clear-field or dark-field masks.

Figure 2F:
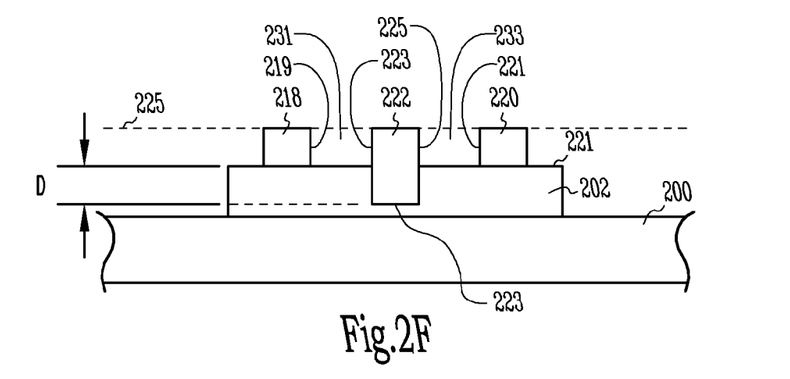
FIG. 2F is a cross sectional view in accordance with the teachings of the present invention of a patterned resonator and waveguides in a processing step subsequent to FIG. 2E.

As shown in FIG. 2F, the photo impacted region 209 of the second layer 212 caused by photo impacting 216 is etched away thereby forming a resonator 222 and at least one waveguide. In this embodiment, the waveguide is an optical waveguide having an input waveguide 218 and an output waveguide 220 on either sides of the resonator.

Many things should now be apparent to those skilled in the art. For example, the resonator 222 has a portion thereof, having a depth "D," formed in the depression between surface 221 of first layer 202 and depression bottom 223. It has another portion thereof formed between surface 221 and plane 225. Simultaneously, the waveguides 218, 220 have no portion thereof formed in the depression and all portions thereof formed on the surface 221 of the first layer and extending from the surface 221 to plane 225. As a result, the aspect ratio between the resonator and the waveguides has decreased (in comparison to the prior art, FIG. 1A, for example) thereby increasing resonator bandwidth.

In particular, the aspect ratio (a.r.) in area 231 has decreased where the input waveguide 218 and resonator 222 front one another along resonator surface 223 and input waveguide surface 219, wherein (a.r.) in area 231 is defined as the area of the input waveguide surface 219 to the area of the resonator surface 223 or (a.r.=area of input waveguide surface 219/area of resonator surface 223). (As will become apparent from the following discussion, the aspect ratio between adjacent resonators (FIG. 5, 522A and 522B) also decreases which also helps with easier processing for the top cladding layer.)

In area 233, the aspect ratio has similarly decreased where the output waveguide 220 and resonator 222 front one another along resonator surface 225 and output waveguide surface 221, wherein (a.r.) in area 233 is defined as the area of the output waveguide surface 221 to the area of the resonator surface 225 or (a.r.=area of output waveguide surface 221/area of resonator surface 225).

In one particular embodiment of the invention, it has been discovered that the aspect ratio decreased so significantly that the resonator bandwidth approximately doubled by increasing from about 16 nm to about 32 nm.

The depth "D" to which the resonator is formed in or fills the depression is dictated by at least two factors. The first is a practical limitation governed by the fill capability inherent in the material of the second layer. For example, if the second layer were deposited as a liquid (amorphous), and the depth of the depression was a relatively substantial percentage of the thickness of the lower cladding, it would likely fill to a greater depth than a non-liquid. Second, the depth is a function of the frequency gain the designed resonator is trying to achieve and varies greatly from application to application.

The height of the resonator between surface 221 and plane 225 is not required to be any particular height and is dictated according to the frequency characteristics demanded by the particular application in which the resonator is used. As a reference point, however, resonator and waveguide height is often in a range from about 1 to about 2 microns.

Similarly, the horizontal spacing between the resonators and the waveguides is not required to be any particular distance and is dictated according to the frequency characteristics demanded by the particular application in which the resonator is used. As a reference point, however, horizontal spacing between resonators and waveguides is often in a range from about 1 to about 2 microns.

It should also be appreciated that the upper surfaces of the input and output waveguides 218, 220 and resonator 222 are all substantially coplanar as defined by plane 225 (although only shown in one dimension). As a result, the manufacturing of a resonator having an increased bandwidth is completed after the etching process performed on the second layer and no additional processing steps need to occur.

Figure 2G:
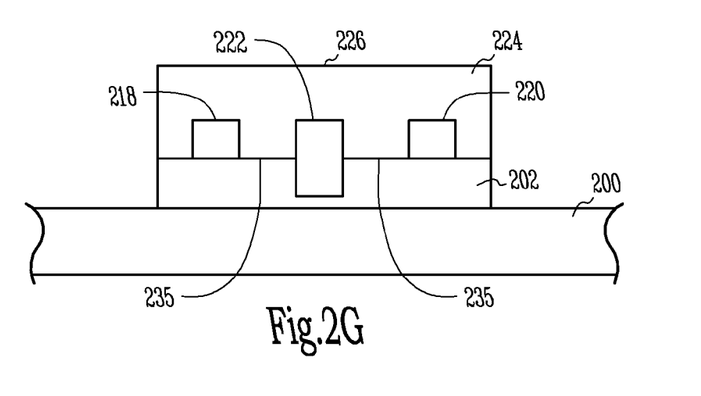
FIG. 2G is a cross sectional view in accordance with the teachings of the present invention of a resonator and waveguides covered by an upper cladding thereby forming a thermo optic device in a processing step subsequent to FIG. 2F.

To complete the thermo optic device, however, a third layer 224 or upper cladding is deposited on the waveguides 218, 220, the resonator 222 and portions 235 of the lower cladding not having a waveguide or resonator. The upper cladding is deposited to a thickness sufficient to prevent outside light from interfering with the light propagated in the waveguide during use. As a reference point, however, thickness for both the upper and lower claddings is often the same and in one embodiment is about 4 microns nominally.

In one embodiment, the third layer is a second silicon oxide layer deposited in the same manner as previously described for the first layer. In another embodiment, the third layer has an index of refraction that is substantially equal to the index of refraction of the first layer.

It will be appreciated that the third layer 224 has an upper surface 226 that can be used to stack multiple thermo optic devices by continuing the deposition, patterning and etching processes described herein. The surface 226 may alternatively contain a heater (not shown) for changing a thermo optical property of the device as light propagates in the waveguide during use.

Figure 5:
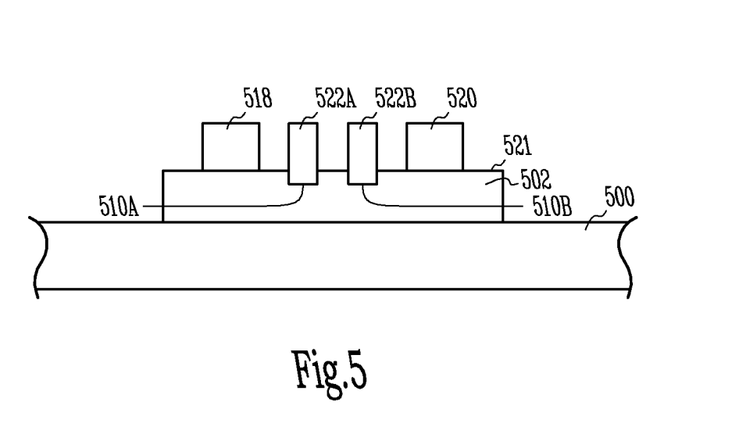
FIG. 5 is a cross sectional view in accordance with the teachings of the present invention of a plurality of resonators formed in a plurality of depressions of a lower cladding.

With reference to FIG. 5, it will be appreciated that thermo optic devices of the present invention may be formed with a more than a single resonator. For example, a plurality of resonators, first and second resonators 522A and 522B, are formed in a corresponding number of depressions, first and second depressions 510A and 510B, while first and second waveguides, input and output waveguides 518, 520 are formed on the surface 521 of the lower cladding. In one embodiment, the horizontal spacing between adjacent resonators is in a range from about 2 to about 3 microns while the horizontal width of the resonator is about 2 microns nominally. In this manner, even further variations in the frequency characteristics of the resonator can be achieved as application demand varies.

Those skilled in the art will appreciate that still other numbers of resonators could be formed in the depressions while forming waveguides on the surface of the lower cladding.

While the foregoing teaches resonators having increased bandwidth, in an alternate embodiment of the present invention, it may be desirable to decrease resonator bandwidth by increasing the previously described aspect ratio(s).

Figure 4A:
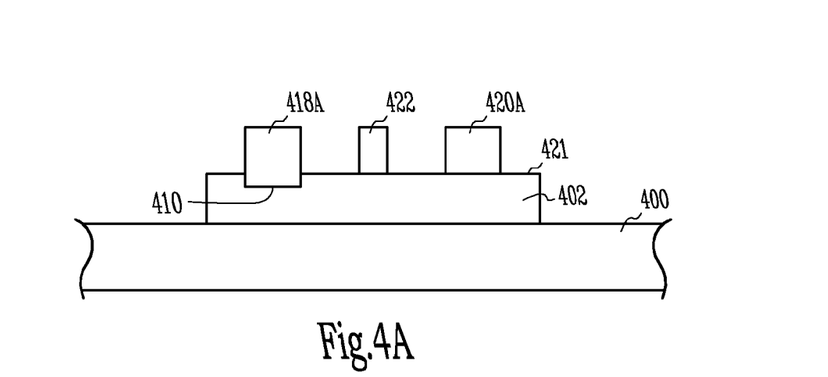
FIG. 4A is a cross sectional view in accordance with the teachings of the present invention of an input waveguide formed in a depression of a lower cladding.
Figure 4B:
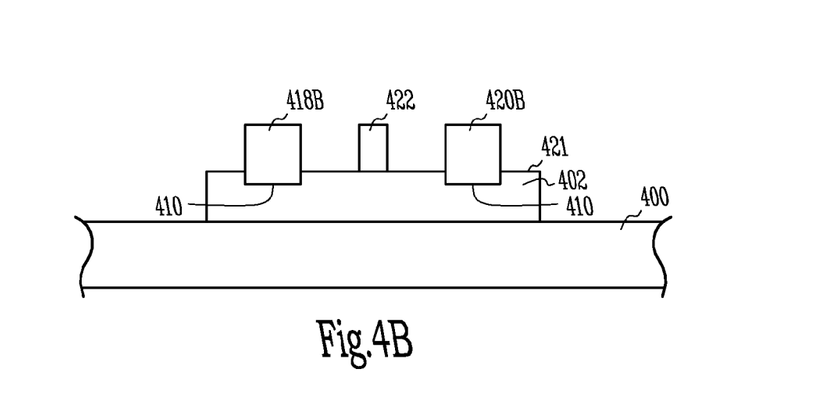
FIG. 4B is a cross sectional view in accordance with the teachings of the present invention of an input and output waveguide formed in depressions of a lower cladding.

For example, with reference to FIG. 4A, a first waveguide, input waveguide 418A is formed in a depression 410 while resonator 422 is formed on the surface 421 of the lower cladding 402. In FIG. 4B, a first and second waveguide, input and output waveguides 418B, 420B are formed in depressions 410 while the resonator 422 is formed on surface 421 of the lower cladding 402.

Figure 10:
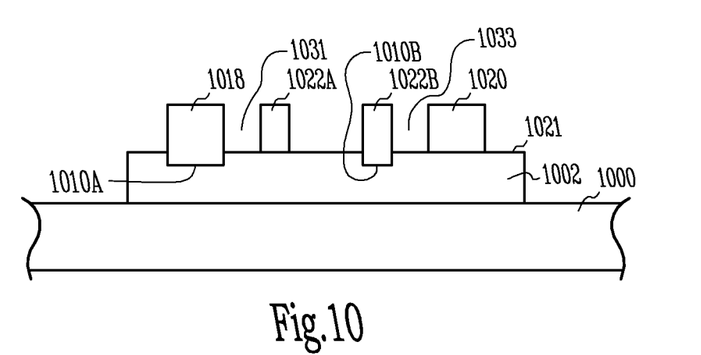
FIG. 10 is a cross sectional view in accordance with the teachings of the present invention of a waveguide and a resonator formed in a plurality of depressions of the lower cladding.

In still another embodiment, it may be desirable to increase some resonator bandwidths while decreasing others. With reference to FIG. 10, waveguide 1018 is formed in a first depression 1010A while a first resonator, resonator 1022A, is formed on the surface 1021 of the lower cladding 1002. Accordingly, the aspect ratio in area 1031 is increased as between waveguide 1018 and resonator 1022A, thereby decreasing bandwidth of resonator 1022A. Waveguide 1020, on the other hand, is formed on the surface 1021 while a second resonator, resonator 1022B, is formed in depression 1010B of the lower cladding. Accordingly, the aspect ratio in area 1033 is decreased as between waveguide 1022 and resonator 1022B, thereby increasing bandwidth of resonator 1022B.

It will be appreciated that during use, the resonators of the present invention may be used with thermo optic devices in a variety of applications. For example, the thermo optic device may be an amplifier, modulator, gate, filter, time delay element, switch, multiplexer, or other.

Figure 11:
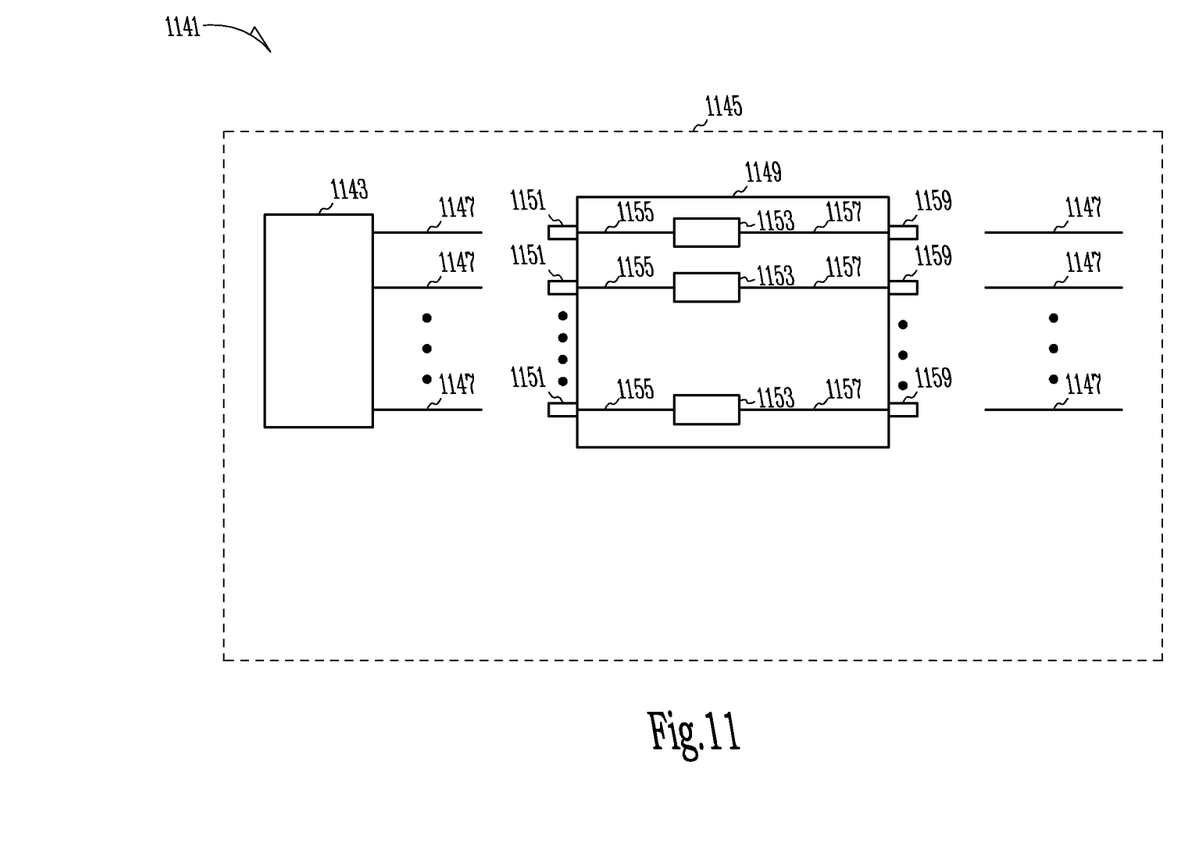
FIG. 11 is a block diagram of a system having a thermo optic package comprising resonators formed in accordance with the teachings of the present invention.

With reference to FIG. 11, a system, having as part thereof a resonator or waveguide formed in accordance with the teachings of the present invention, is shown generally as 1141. The system may be an exclusively fiber optic system or may be a system having other software and hardware devices, as indicated by the dashed line 1145, operably coupled to at least one fiber optic component thereof.

In either system, a light source 1143 will be provided as the source for propagating light signals along at least one fiber optic line 1147. Well known light sources include, but are not limited to, laser light sources. In the embodiment shown, the system 1141 includes a plurality of fiber optic lines 1147.

Coupleable to the fiber optic lines via a plurality of input fiber optic ports 1151 is a thermo optic package 1149. Contained within the thermo optic package is at least one thermo optic device 1153 having at least one resonator or waveguide formed in accordance with the present invention. In the embodiment shown, the thermo optic device 1153 is coupled to the input fiber optic port 1151 via an input connector 1155 while an output connector 1157 couples the thermo optic device to an output fiber optic port 1159. In turn, the output fiber optic port 1159 is coupled to another fiber optic line 1147 of system 1141.

During use, a system user merely needs to couple fiber optic lines 1147 to the input and output fiber optic ports of the package 1149 to readily achieve at least one resonator or waveguide having an increased or decreased bandwidth as necessary.

Figure 12:
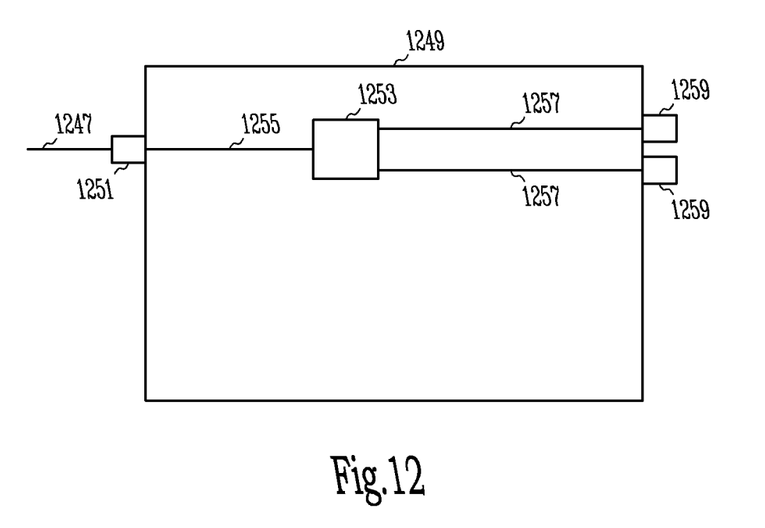
FIG. 12 is an alternative embodiment of a thermo optic package comprising resonators formed in accordance with the teachings of the present invention.

With reference to FIG. 12, an alternative embodiment of a thermo optic package 1249 is shown having a thermo optic device 1253 with a single input connector 1255 and a plurality of output connectors 1257. The input connector 1255 connects with input fiber optic port 1251 which is readily matable with a fiber optic line 1247 of a system. The output connectors 1257 of thermo optic device 1253 are each matable with an output fiber optic port 1259.

In another embodiment, the single input connector of the thermo optic device 1253, having a resonator or waveguide formed in accordance with the present invention, may alternatively be replaced with two or more input connectors while the two output connectors may be replaced with one or more output connectors depending upon the type and desired use of the thermo optic device 1253.

The above structures and fabrication methods have been described, by way of example, and not by way of limitation, with respect to resonators for thermo optic devices.

In particular, the resonator of a thermo optic device is formed in the same process steps as a waveguide and is formed in a depression of a lower cladding while the waveguide is formed on a surface of the lower cladding. In this manner, since an upper surface of the resonator and the waveguide is substantially coplanar, the aspect ratio as between the waveguide and resonator in an area where the waveguide and resonator front or face one another decreases thereby increasing the bandwidth of the resonator. The depression is formed by photomasking and etching the lower cladding before forming the resonator and waveguide. Some depression embodiments include trenches, concavities and angular indentations.

In another embodiment, a plurality of resonators are taught that are formed in a plurality of depressions of the lower cladding while a plurality of waveguides are formed on the surface of the lower cladding.

In still another embodiment, waveguide(s) are formed in the depression(s) of the lower cladding while the resonator is formed on the surface. In this manner, the aspect ratio increases thereby decreasing bandwidth of the resonator.

Thermo optic devices formed with these resonators are also taught.

As a result, resonators of this invention can be formed quicker and cheaper without any corresponding sacrifice in quality, reliability or longevity.

The present invention has been particularly shown and described with respect to certain preferred embodiment(s). However, it will be readily apparent to those of ordinary skill in the art that a wide variety of alternate embodiments, adaptations or variations of the preferred embodiment(s), and/or equivalent embodiments may be made without departing from the intended scope of the present invention as set forth in the appended claims. Accordingly, the present invention is not limited except as by the appended claims.

What is claimed is:

1. A thermo-optic device, comprising:
   a first cladding with a surface and at least one depression in the surface;
   features on the first cladding, the features including a first waveguide extending from the first cladding to a top waveguide surface, a second waveguide and a resonator extending up from the first cladding to the top waveguide surface, the resonator disposed between the first waveguide and the second waveguide, at least one of the features positioned in the at least one depression of the first cladding to provide a desired waveguide/resonator aspect ratio for a desired bandwidth;

a second cladding over and around the first waveguide, the second waveguide and the at least one resonator, wherein the resonator is a first resonator in a first depression; and a second resonator in a second depression in the first cladding.

2. The thermo-optic device of claim 1, wherein a top resonator surface is substantially coplanar with a top waveguide surface.

3. The thermo-optic device of claim 1, further including a substrate, the cladding being on the substrate.

4. The thermo-optic device of claim 1, wherein the at least one depression is a trench.

5. The thermo-optic device of claim 1, wherein at least one of the waveguide and the resonator is formed of silicon oxide.

6. The thermo-optic device of claim 1, wherein at least one of the waveguide and the resonator is formed of silicon oxynitride.

7. The thermo-optic device of claim 1, wherein the resonator and the first cladding are formed of materials of different indices of refraction.

8. The thermo-optic device of claim 1, wherein the second cladding and the first cladding are formed from a common materials.

9. A system for connection to a fiber optic line, comprising:
a package coupleable with the fiber optic line; and
a thermo-optic device, the device disposed in the package and including:
    a first cladding with a surface and at least one depression in the surface;
    features on the first cladding, the features including a first waveguide extending from the first cladding to a top waveguide surface, a second waveguide and a resonator extending up from the first cladding to the top waveguide surface, the resonator disposed between the first waveguide and the second waveguide, at least one of the features positioned in the at least one depression of the first cladding to provide a desired waveguide/resonator aspect ratio for a desired bandwidth;
    a second cladding over and around the first waveguide, the second waveguide and the at least one resonator, wherein the resonator is a first resonator in a first depression; and
    a second resonator in a second depression in the first cladding.

10. The system of claim 9, wherein the at least one depression is filled with a resonator deposit.

11. The system of claim 9, wherein the top waveguide surface of at least one of the first and second waveguides is substantially coplanar with a surface of the resonator.

12. The system of claim 9, wherein the package further includes at least one input fiber optic port and at least one output fiber optic port.

13. The system of claim 12, wherein the device includes at least one input connector coupled to the at least one input fiber optic port and at least one output connector coupled to the at least one output fiber optic port.

14. A package, comprising:
a thermo-optic device comprising
    a first cladding with a surface and at least one depression in the surface;
    features on the first cladding, the features including a first waveguide extending from the first cladding to a top waveguide surface, a second waveguide and a resonator extending up from the first cladding to the top waveguide surface, the resonator disposed between the first waveguide and the second waveguide, at least one of the features positioned in the at least one depression of the first cladding to provide a desired waveguide/resonator aspect ratio for a desired bandwidth;
    a second cladding over and around the first waveguide, the second waveguide and the at least one resonator, wherein the resonator is a first resonator in a first depression; and
    a second resonator in a second depression in the first cladding.

15. The package of claim 14, wherein the a top resonator surface of the resonator and the top waveguide surface are substantially coplanar.

16. The package of claim 14, wherein the top waveguide surface of at least one of the first and second waveguides is substantially coplanar with a top resonator surface of the resonator.

17. The package of claim 14, further including an input connector and an output connector coupled with the device.

18. The package of claim 17, further including an input fiber optic port coupled to the input connector and an output fiber optic port coupled to the output connector.

19. The package of claim 17, wherein the input connector is a single input connector, and the output connector is one of a plurality of output connectors.

\* \* \* \* \*